March 31, 1925. 1,531,381
J. FARRELL
DROP TINE GRAPPLING FORK
Filed June 11, 1923   4 Sheets-Sheet 1
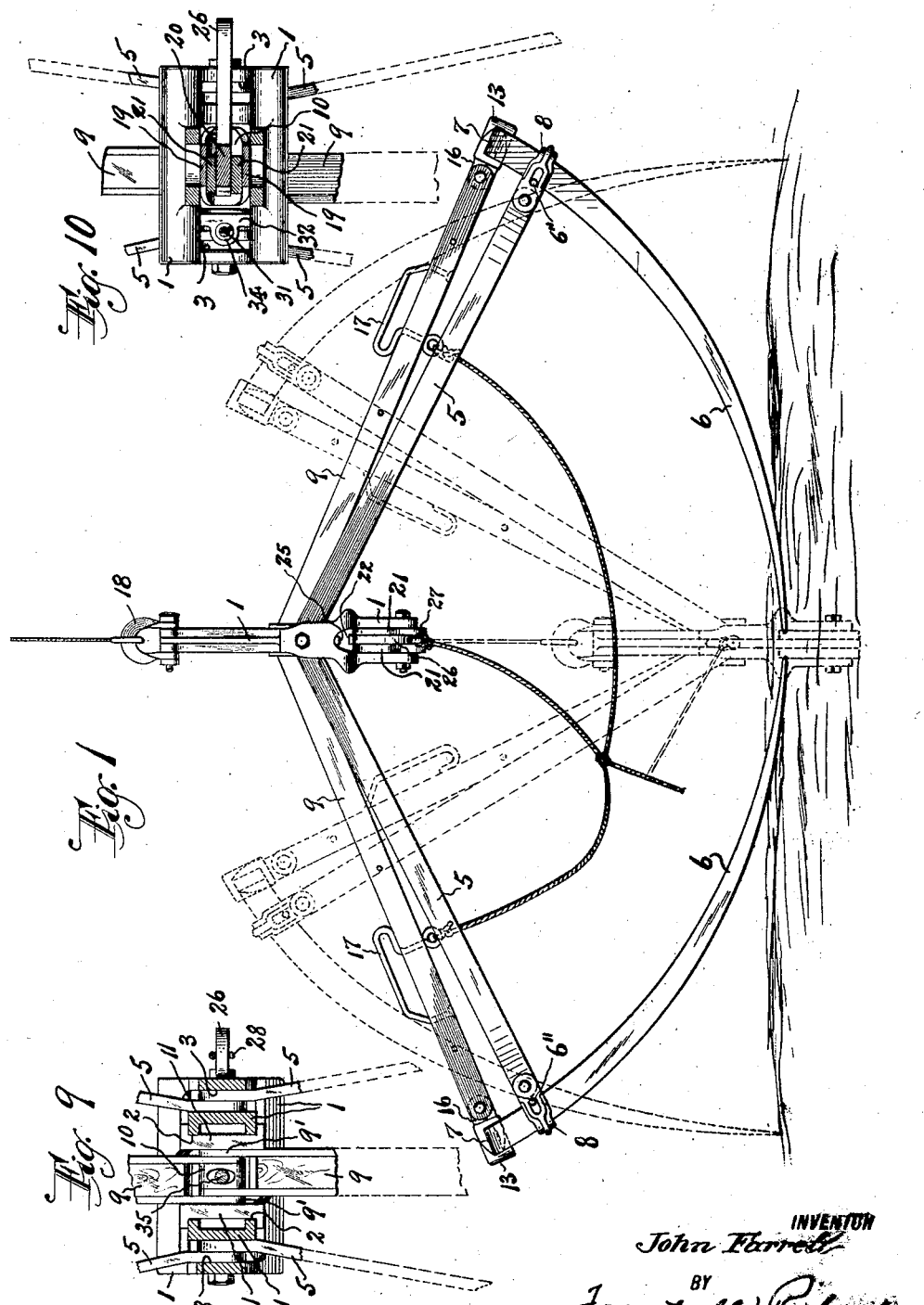
INVENTOR
John Farrell
BY
Krautzel & Richards
ATTORNEYS March 31, 1925.
1,531,381
J. FARRELL
DROP TINE GRAPPLING FORK
Filed June 11, 1923    4 Sheets-Sheet 2
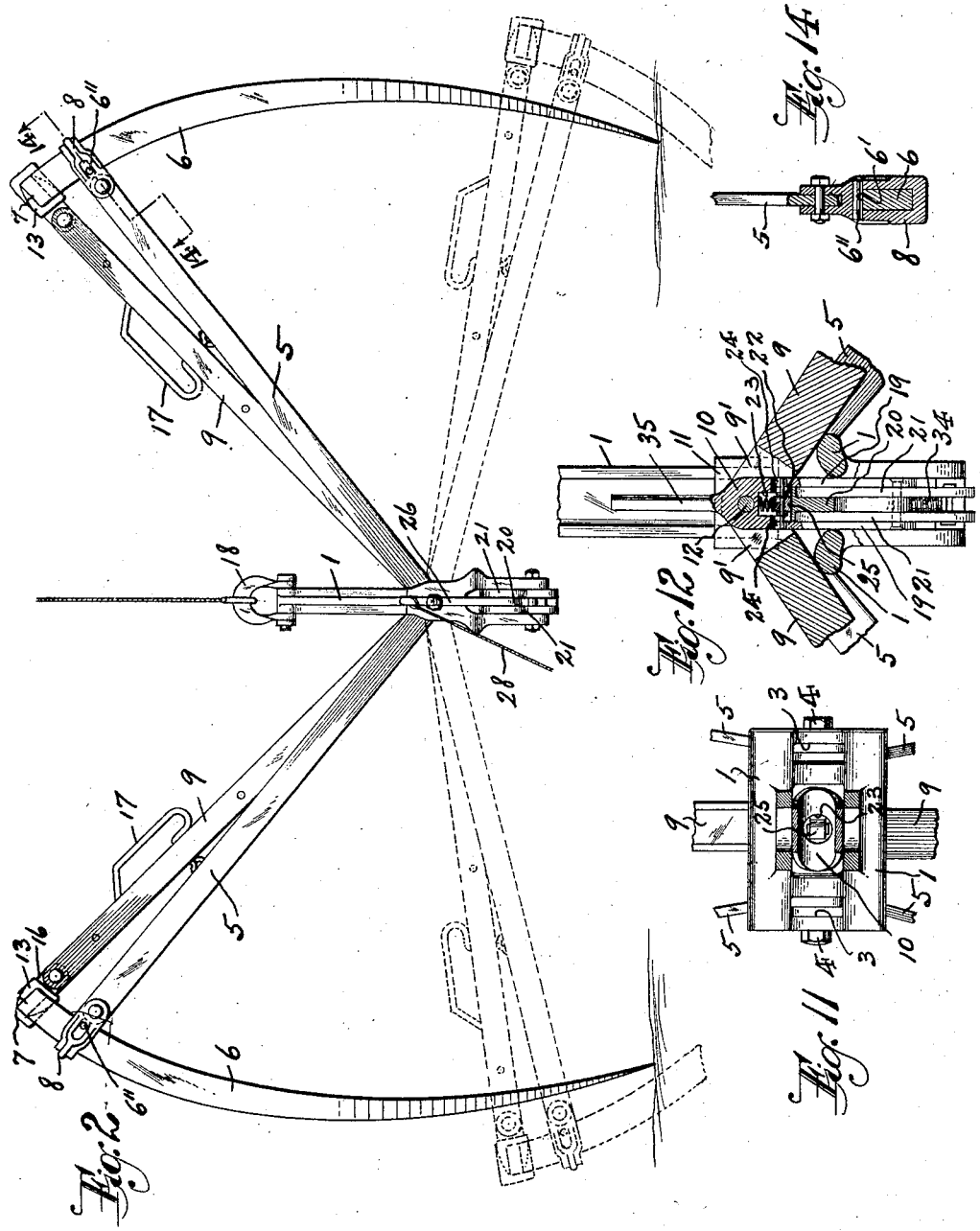
INVENTOR
John Farrell
BY
Frantz and Richards
ATTORNEYS

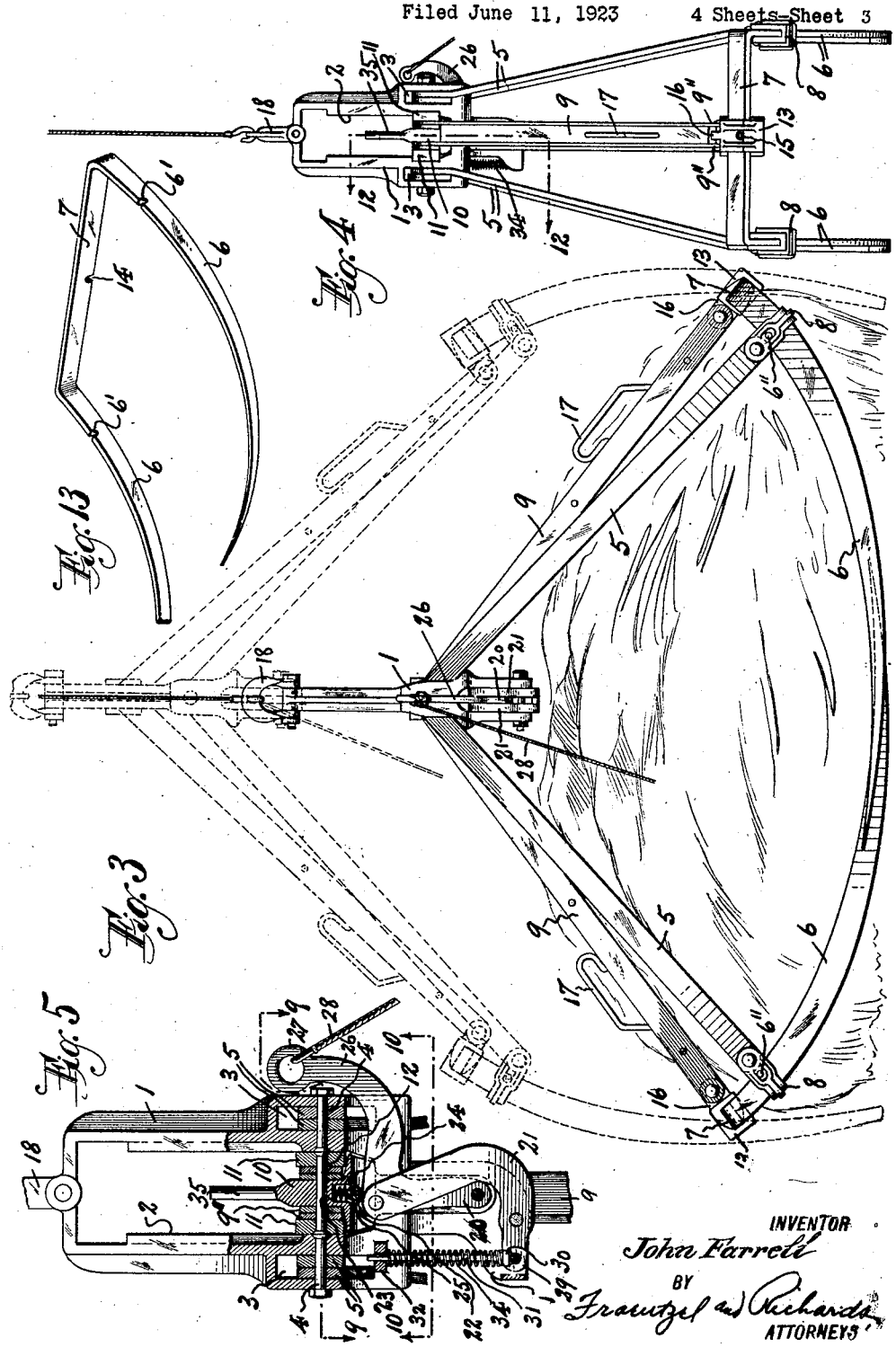

March 31, 1925.
J. FARRELL
1,531,381
DROP TINE GRAPPLING FORK
Filed June 11, 1923   4 Sheets-Sheet 4
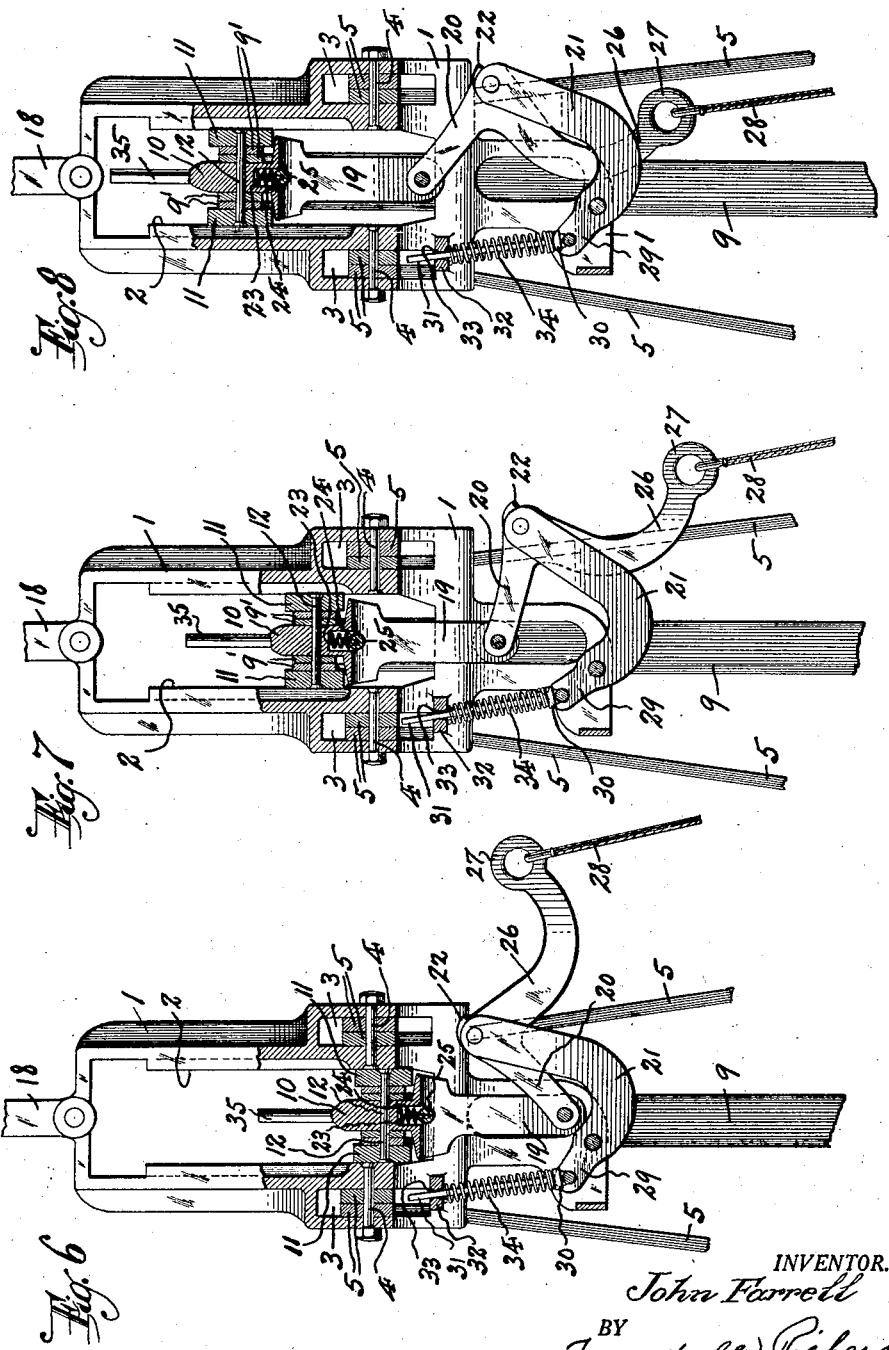
INVENTOR.
John Farrell
BY
Frautzel and Richards
ATTORNEYS.

Patented Mar. 31, 1925.

1,531,381

UNITED STATES PATENT OFFICE.

JOHN FARRELL, OF NEWTON, NEW JERSEY.

DROP-TINE GRAPPLING FORK.

Application filed June 11, 1923. Serial No. 644,619.

*To all whom it may concern:*

Be it known that I, JOHN FARRELL, a citizen of the United States, residing at Newton, in the county of Sussex and State of New Jersey, have invented certain new and useful Improvements in Drop-Tine Grappling Forks; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to improvements in drop-tine grappling forks, adapted to handle hay, straw, etc.; and the invention has reference, more particularly, to improvements in that type of grappling fork shown and described in my prior Letters Patent of the United States No. 870,768, dated November 12th, 1907.

This invention has for its principal object to provide improvements in the arrangement and operation of the tines and their controlling mechanism, whereby the tines will resume a partially closed position as soon as the load is dropped from the fork, so that said tines are directed inward, in which position they are best disposed to avoid catching on the sides of a mow or injuring a workman standing below when the fork is being lowered; and, furthermore, the invention has for an additional object to provide improvements in the trip lock mechanism of the fork, whereby said lock mechanism, after being tripped, will automatically set itself in normal locked position when the partially closed tines strike the hay as the fork reaches the bottom of its drop, the points of the tines being caused by such contact to move upward, whereupon the parts resume interlocked relation, leaving, however, the fork partly spread so that it is easier for the operator to fully open and then force the same into the hay.

This invention has for further objects, the provision of various detail improvements in the fork structure, all of which will be clearly understood from the following detailed description of the same.

The invention is clearly illustrated in the accompanying drawings, in which:—

Figure 1 is an elevation of the fork, showing the position of the fork at the end of its drop as it strikes the hay, whereby the tines are pressed slightly upward to automatically cause a re-setting of the trip lock mechanism to its normal locked arrangement, the dotted position of the parts showing how the tines may be then raised and spread by the operator to cause the tines to be positioned to penetrate the hay and thus grapple a portion of the load for removal to the mow; Figure 2 is an elevation showing the fork made ready to grapple the hay, the dotted position of the parts showing the manner of forcing the tines into the hay; Figure 3 is an elevation showing the fork closed, the dotted position of the parts showing the position of the fork when releasing or dropping the load; Figure 4 is an end elevation of the fork; Figure 5 is an enlarged vertical longitudinal section through the head frame and trip lock mechanism of the fork, said lock mechanism being shown in normal locked arrangement; Figures 6, 7 and 8 are respectively vertical longitudinal sections similar to that shown in Figure 5, and respectively illustrating various stages of the lock tripping operations; Figure 9 is a fragmentary horizontal section, taken on line 9—9 in Figure 5; Figure 10 is a fragmentary horizontal section, taken on line 10—10 in Figure 5; Figure 11 is a view similar to that shown in Figure 10, but with the trip mechanism removed; Figure 12 is a fragmentary transverse vertical longitudinal section, taken on line 12—12 in Figure 4 and drawn on an enlarged scale; Figure 13 is a perspective view of one of the tine members of the fork; and Figure 14 is an enlarged detail section taken on line 14—14 in Figure 2.

Similar characters of reference are employed in all of the hereinabove described views, to indicate corresponding parts.

Referring now to said drawings, the reference character 1 indicates a head-frame having a central longitudinal slideway 2, and adjacent to its lower end, and on each side of said slideway 2, receiving openings or sockets 3. Pivotally fulcrumed in each receiving opening or socket 3 by means of fulcrum pins 4 are oppositely extending supporting bars 5. The reference character 6 indicates the tine members, which are arranged in pairs laterally spaced apart by a heel bar 7. Each tine member 6 is provided with a yoke-piece 8 embracing the same forward of the heel-bar 7. In order to securely retain said yoke-pieces in rigid immovable connection with the tine members, the marginal edge portions of the latter are provided with indented notches 6' (see Figure 11) through which pass bolts or rivets 6", which bolts or rivets 6" also pass through said yoke pieces. The outer ends of the tine supporting bars 5 are respectively pivotally secured between the arms of the respective yoke-pieces 8. The reference character 9 indicates a pair of oppositely extending thrust bars. The inner ends of said thrust bars are bifurcated, as at 9', to straddle a vertically reciprocable slide block 10, which is provided exteriorly of the thrust bar ends with slide-plates 11, which embrace and slide upon the sides of the slideway 2 of the head-frame 1. Said inner ends of the thrust bars are pivotally connected with said slide block and its slide plates by means of a transverse fulcrum pin 12, which also serves to hold said parts in assembled relation one with another. The heel bars 7 of said tine members are embraced by sleeves 13, which are centrally located thereon. Said sleeves are secured against shifting on said heel-bars, by providing an indented notch 14 (see Figure 13) in the marginal edge of each heel-bar, and then passing a key-pin 15 (see Figure 4) through each sleeve 13 to extend through said notch 14. The sleeves 13 are provided at their inner sides with perforate ears 16 whereby the outer bifurcated ends 9" of said thrust bars may be pivotally connected therewith. Each thrust bar 9 is provided, on its upper side intermediate its ends, with a hand-grip 17.

Pivotally connected with the upper end of said head-frame 1 is a suitable clevis 18 by means of which the fork can be operatively connected with a trolley or movable carriage mounted to travel on an elevated support in the usual manner.

Integrally connected with said slide block 10 are a pair of transversely spaced depending arms 19 between the lower ends of which is pivotally connected the lower end of a trip-lever 20 which normally extends upwardly toward the bottom of said slide block 10. The upper end of said trip lever 20 is fulcrumed between the upper ends of a pair of supporting links 21, the lower ends of which are pivotally mounted in connection with the lower end of said head-frame 1. Integrally formed in connection with the upper end of said trip lever 20 is a latch-nosing 22. Housed in a socket chamber 23 formed in the lower end of said slide-block 10 is an upwardly yieldable spring-pressed latch-roller 25, the journals of which ride in vertical slots 24. Said latch-roller normally engages said latch-nosing 22 of the trip lever to hold the latter in normal initial or locking position relative to the slide-block 10. Extending outwardly and upwardly from the upper portion of said trip lever 20 is a trigger arm 26 terminating in an eye-member 27 to permit the securing thereto of a trip or pull rope 28. Integrally connected with the pivoted ends of said supporting links 21 are outwardly and normally horizontally extending lever projections 29, between the free ends of which is pivotally mounted a thrust piece 30 having an upwardly extending guide rod 31. Formed in connection with a portion of said head frame 1 is a bridge piece 32 having a central opening 33 through which the free end of said guide-rod 31 extends. Arranged around said guide-rod 31 intermediate said thrust-piece 30 and said bridge piece 32 is a spirally coiled compression spring 34. The supporting-links 21, trip-lever 20 and trigger arm 26 with the above described associated parts forms a toggle lever system or arrangement which provides a trip lock mechanism for normally holding the slide-block 10 in lowermost position and consequently locking the tine-members in normal load carrying position. When the trip lock mechanism is disposed in normal locked arrangement, as shown more particularly in Figure 5 of the drawings, the tine members are held by the thrust bars in normal raised or load supporting position, and as thus disposed the fulcrums of the thrust bars and supporting bars are alined or coincide one with the other, and consequently the tine members may be swung upwardly with the thrust bars and supporting bars into the positions shown in Figure 2 so that the points of the tines are downwardly directed, in which position the same may be thrust into the hay to cause the same to grapple a load to be hoisted; the grappled load then resting on the top of the tines as shown by the dotted lines in said Figure 2. The load may now be hoisted up into the mow.

The operation of the trip mechanism to release the tines to permit the same to swing downward to drop the load is as follows:—

After the fork has been hoisted to the point where it is desired to deposit its load, the operator pulls upon the trip or pull rope 28 to actuate the trigger arm 26 and consequently the trip lever 20. The initial movement of the trip lever 20 removes the latch-nosing 22 from engagement with the latch-roller 25. Continued outward swing of the trip lever causes an outward swing of the supporting links 21 which turn on their fulcrums, while at the same time the trip-lever 20 begins to swing upwardly relative to its pivotal support in connection with said supporting links 21 (see Figure 6 of the drawings), until the end of said trip-lever 20 (which is pivotally connected with the arms 19 of the slide-block 10) passes upwardly beyond the dead center of its fulcrum as provided by its pivotal connection with said supporting links 21, which position is shown in Figure 7 of the drawings. This upward swing of the trip-lever 20 releases the slide-block 10 for free upward movement in the slideway 2 of the head frame 1, whereupon the weight of the load on the tine-members 6 exerts a pressure on the thrust bars 9 through the heel-bars 7 as the tine-members swing downwardly. When the supporting-links 21 swing outwardly, the projections 29 thereof lift so that the spring 34 is compressed. When, however, the slide-block 10 moves upwardly to the top of the head frame 1 the supporting-links 21 swing inwardly, so that the toggle lever system is fully opened, the spring 34 is slightly relaxed and the tine-members 6 are in their dropped position shown by dotted lines in Figure 3 of the drawings. This movement of the toggle lever system is shown in Figure 8 of the drawings. As soon as the load drops away from the tine-members 6, the balance of the latter, as interconnected with the slide-block 10 through the thrust-bars 9, is such that the same tend to swing upwardly to partially closed position, and consequently the slide-block 10 is lowered in the slide-way 2 of the head-frame and the toggle-lever system resumes the position shown in Figure 7, the spring 34 being then compressed under comparatively strong tension. When said tine members are in such balanced and partially closed position, the points thereof are inwardly directed, so that they are prevented from catching in the sides of the mow when the fork is lowered, and are also safely positioned so as to offer no risk of injury to workmen standing below and awaiting the lowering of the fork.

After the above operations are completed, the fork is lowered to grapple a new load. As the fork reaches the bottom of its drop, the partially closed tines strike the top of the pile of hay below (in the manner shown by the full lines in Figure 1 of the drawings), whereupon the tine-members 6 are impressed upwardly, thereby exerting a pull on the thrust bars 9 tending to slide the slide-block 10 further down in the slideway 2 of the head-frame, thus swinging the trip-lever 20 further down until the end thereof (which is pivotally connected with the arms 19 of the slide-block 10) passes downwardly beyond the dead center of its fulcrum as provided by its pivotal connection with said supporting links 21. As soon as such dead center is passed, the stored energy or tension of the spring 34 is free to thrust downwardly upon the projections 29 of the supporting-links 21, to rock the latter on their fulcrum, thus swinging the same inward to normal initial position, while at the same time causing the trip-lever 20 and slide block 10 to also automatically return to normal initial positions, with the latch-nosing 22 sprung behind the latch-roller 25, and consequently automatically resetting to closed and locked position the toggle-lever system, whereby the parts are again normally interlocked and ready for a repetition of the grappling and hoisting operations above described.

In order to limit the upward movement of the slide-block 10, when the same is released, and to thereby prevent both injury thereto and undue strains or injury to the toggle lever system, said slide-block 10 is provided at its upper end with an upwardly projecting stop-stud 35, which in operation, fetches up against the top of the head-frame 1.

Having thus described my invention, I claim:—

1. In a device of the kind described, a head-frame; supporting bars pivoted to said head-frame; tine-members pivoted to the outer ends of said supporting bars; a slide-block vertically movable in said head-frame; thrust-bars interconnecting said slide-block and tine-members; a normally closed toggle mechanism adapted when opened to release said slide-block to permit said tine-members to drop; and an additional spring actuated lever means associated with said toggle mechanism, which is compressed by the initial movement of said toggle mechanism from open to closed position, and thus by its stored tension adapted to complete the closing of the latter after the same is moved past its dead center position when the tine-members are fully raised.

2. In a device of the kind described, a head-frame; supporting bars pivoted to said head-frame; tine-members pivoted to the outer ends of said supporting bars; a slide-block vertically movable in said head-frame; thrust bars interconnecting the heels of said tine-members with said slide-block; a normally closed toggle means interconnected between said slide-block and the lower portion of said head-frame; an oppositely extending lever projection connected with said toggle means; and a compression spring engaging the free end of said lever projection adapted to be placed under operative tension, whereby when the tine-members are swung upwardly to raised position, and thus through the interconnecting thrust bars and slide block the toggle means is folded beyond its dead center position, the stored tension of said compression spring will automatically complete the closing of said toggle means to normal initial locking position.

3. In a device of the kind described, a head-frame, two pairs of oppositely arranged tines, supporting bars pivotally connected at their inner ends with said head-frame and pivotally connected with said tines at their outer ends, a slide-block mounted for vertical reciprocation in said head-frame, oppositely extending thrust bars pivotally connected at their inner ends with said slide-block and pivotally connected with the heel portions of said tines at their outer ends, a supporting link means pivotally connected with the lower end of said head-frame, a trip lever pivotally fulcrumed in connection with the free end of said supporting link means, the opposite end of said trip lever being pivotally connected with the lower end of said slide-block, said supporting link means having a lever projection connected with the pivoted end thereof, said head-frame having a transverse stationary bridge-piece, and a compression spring arranged between said bridge piece and lever projection adapted to be placed under full operative tension when said trip lever and its supporting link means are at dead center positions, as and for the purposes described.

4. In a device of the kind described, a head-frame, two pairs of oppositely arranged tines, supporting bars pivotally connected at their inner ends with said head-frame and pivotally connected with said tines at their outer ends, a slide-block mounted for vertical reciprocation in said head-frame, oppositely extending thrust bars pivotally connected at their inner ends with said slide-block and pivotally connected with the heel portions of said tines at their outer ends, a supporting link means pivotally connected with the lower end of said head-frame, a trip lever pivotally fulcrumed in connection with the free end of said supporting link means, the opposite end of said trip lever being pivotally connected with the lower end of said slide-block, a vertically yieldable spring pressed latch-roller housed in the lower end of said slide-block, said trip-lever having a latch-nosing engageable with the latch-roller to normally hold said trip lever in interlocked relation to said slide-block, said supporting link means having lever projections connected with the pivoted end thereof, said head-frame having a transverse stationary bridge-piece, and a compression spring arranged between said bridge-piece and lever projection adapted to be placed under operative tension when said trip lever and its supporting link means are at dead center positions, as and for the purposes described.

5. In a device of the kind described, a head-frame, a slide-block in said head-frame, two pairs of oppositely arranged tines, supporting bars extending from the tines and pivotally connected with both said tines and said head-frame, thrust bars having their ends pivotally connected with said slide-block and said tines, a toggle lever means connected between said head-frame and said slide-block normally disposed to lock said slide-block against movement on the head frame when the tines are closed, a trigger arm for actuating said toggle lever means, said toggle lever means having an oppositely extending lever projection connected with its lower pivoted end, said head-frame having a transverse stationary bridge-piece, and a compression spring arranged between said bridge-piece and lever projection adapted to be placed under operative tension when said toggle lever means is at the dead center of its open position, as and for the purposes described.

6. In a device of the kind described, a head-frame, a slide-block in said head-frame, two pairs of oppositely arranged tines, supporting bars extending from the tines and pivotally connected with both said tines and said head-frame, thrust bars having their ends pivotally connected with said slide-block and said tines, a toggle lever means connected between said head-frame and said slide-block normally disposed to lock said slide-block against movement on the head-frame when the tines are closed, a trigger arm for actuating said toggle lever means, said toggle lever means having an oppositely extending lever projecting connected with its lower pivoted end, said head-frame having a transverse stationary bridge-piece, a thrust-piece pivotally connected with the free end of said lever projection, a guide-rod extending between said thrust-piece and said bridge-piece, and a spiral compression spring around said guide-rod intermediate said thrust-piece and said bridge-piece adapted to be placed under operative tension when said toggle lever means is at the dead center of its open position, as and for the purposes described.

7. In a device of the kind described, a head-frame, a slide-block in said head-frame, two pairs of oppositely arranged tines, supporting bars extending from the tines and pivotally connected with both said tines and said head-frame, thrust bars having their ends pivotally connected with said slide-block and said tines, a toggle lever means connected between said head-frame and said slide-block normally disposed to lock said slide-block against movement on the head-frame when the tines are closed, a trigger arm for actuating said toggle lever means, said toggle means having an oppositely extending lever projection connected with its lower pivoted end, said head-frame having a transverse stationary bridge-piece, a thrust-piece pivotally connected with the free end of said lever projection, a guide-rod extending between said thrust-piece and said bridge-piece, a spiral compression spring around said guide-rod intermediate said thrust-piece and said bridge-piece adapted to be placed under operative tension when said toggle lever means is at the dead center of its open position, a vertically yieldable spring-pressed latch-roller housed in the lower end of said slide-block, and said toggle lever means having at its free end a latch nosing engageable with said latch-roller to hold said toggle lever means and slide-block in normal interlocked relation.

8. In a device of the kind described, the combination with the head-frame thereof, of a slide-block vertically reciprocable in said head-frame, releasable locking toggle-means interconnected between said head-frame and said slide-block adapted when opened to free said slide-block for upward movement on said head-frame, and a stop-projection on the upper end of said slide-block engageable with the upper end of said head-frame to limit the upward movement of the former on the latter, as and for the purposes described.

In testimony, that I claim the invention set forth above I have hereunto set my hand this 8th day of June 1923.

JOHN FARRELL.

Witnesses:
GEORGE D. RICHARDS,
FRANK I. FARRELL.